Patented July 6, 1948

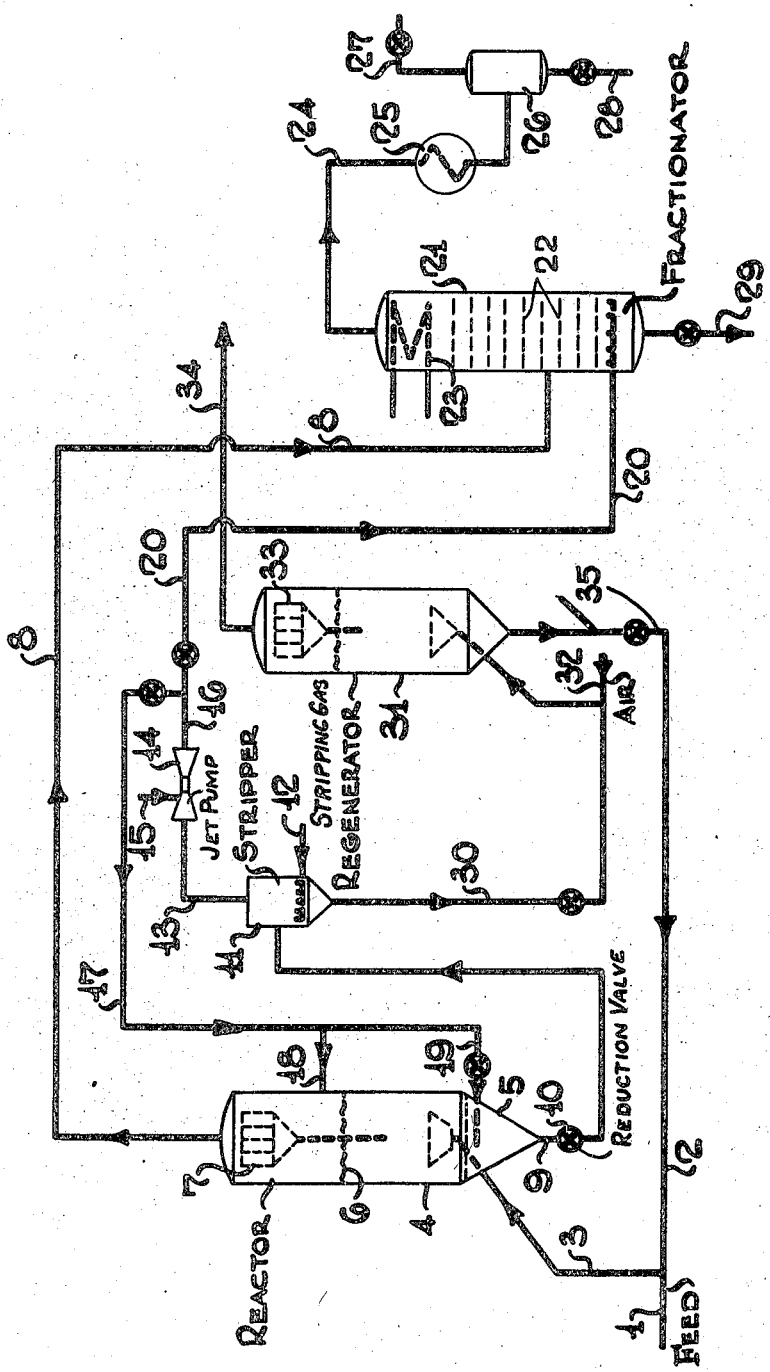

2,444,832

UNITED STATES PATENT OFFICE 2,444,832

METHOD OF REMOVING VAPOROUS REACTANTS FROM CATALYST USED IN HYDROCARBON CONVERSION

Robert W. Krebs, Baton Rouge, La., assignor to Standard Oil Development Company, a corporation of Delaware Application December 30, 1944, Serial No. 570,731

3 Claims. (Cl. 196—52)

The present invention relates to the art of carrying out catalytic reactions in which the catalyst is present in a fluidized form, and more specifically to improvements in the process of increasing the yield and improving the recovery of the products.

The drawing is a semi-diagrammatic view in sectional elevation of an apparatus for the catalytic cracking of hydrocarbon oil and the regeneration and return of the catalyst.

In recent years there have been important applications of the fluidized solid technique to catalytic reactions, especially in the field of catalytic cracking of hydrocarbon oils. It has been the practice to conduct the reaction in the presence of a fluidized stream of finely divided catalyst, maintaining the catalyst and the hydrocarbon vapor in contact for such time as to effect the cracking and to at least partially deactivate the catalyst by carbon deposition thereon. The catalyst is then passed while still in fluidized form to a regeneration zone wherein the carbon is removed by combustion with air and the catalyst thus regenerated is returned to the reactor for reuse.

It has been found that the catalyst withdrawn in a fluidized stream from the reaction vessel has a considerable amount of hydrocarbon products associated therewith either in an adsorbed state upon the catalyst or mechanically included between the catalyst particles or by both means. The hydrocarbon so held is swept along to the regenerator and is lost since it is burned during the regeneration of the catalyst. The loss of the hydrocarbon is naturally a matter of concern but the necessity of burning it is likewise objectionable. A very large portion of the cost of the catalytic cracking unit lies in the regenerator and its ancillary equipment so that if the hydrocarbon products associated with the catalyst are removed before regeneration, there is the double advantage of increasing the yield of desirable hydrocarbons and decreasing the required size of the regenerator. The above problem has been recognized and efforts have been made to strip the spent catalyst of hydrocarbon constituents before regeneration but most means have been complicated and some have not proved to be particularly effective. In the present invention, an improved method for effecting the stripping is presented.

Turning to the drawing, numeral 1 designates the feed line through which the oil to be cracked is supplied from some source not shown. The oil is admixed with a fluidized stream of hot, finely divided catalyst supplied by the line 2 and the oil vaporized by the heat of the catalyst passes into the reactor 4 along with the finely divided catalytic material. This reactor is a tall, vertical drum with a conical base 5 and within it the oil vapor and the catalyst are in the form of a rapidly swirling, ebullient mass with what appears to be a surface, as indicated at 6, separating a lower, more dense phase below and a lighter, less dense phase above.

A cyclone separator 7 is provided in the upper portion of the reactor and the hydrocarbon vapor must pass through the separator before finding an exit by vapor pipe 8. The catalyst separated by means of the cyclone 7 drops back into the reaction zone.

From the bottom of the conical portion of the reactor, the spent catalytic agent, deactivated by a deposition of carbon and containing associated therewith hydrocarbon vapors, is withdrawn by a pipe 9 and is discharged through a pressure reduction valve 10 into a stripping vessel 11. The stripping vessel is shown merely as an enlarged chamber which is maintained under reduced pressure or vacuum allowing the gas to pass out and the solid to settle out. A stream of gas may be admitted at 12 so as to assist the stripping and baffling means (not shown) may be disposed within the chamber to cause the catalyst to be tumbled about allowing release of the contained hydrocarbon vapors. One practical design of the stripper is a cylindrical cyclone into which the catalyst laden gas is passed tangentially so as to give a whirling motion. The solid is carried to the outer edge of the vessel and settles into the lower part of the separator to be stripped by the upward moving gases admitted by 12. The stripping gas and the stripped vapors pass off through an upper pipe 13 to a jet pump 14 which is employed to create the vacuum. This pump may be in the form of a Venturi throat with steam or air added at 15 to generate the vacuum.

The gas and vapors are thus compressed by this pump and forced through a pipe 16 and disposed of as desired. One method of disposal consists of discharging these vapors into the reactor 4 by means of the branch pipe 18. A small amount of the catalyst passes along with these vapors, but this gives no difficulty as it is returned to the mass in the reactor. The hydrocarbon vapors pass through the separator 7 and out through the pipe 8, as referred to above. If desired, the vapors may be discharged into the bottom of the reactor through a side branch pipe 19.

Another method of disposal consists in passing these vapors through a line 20 which discharges into the base of a product fractionator 21 which is used to redistill the main product of the process. Pipe 8, referred to above, also discharges into the fractionator which is a tall tower fitted with plates of the conventional type indicated generally at 22. It has a reflux coil 23 at the upper end and the fractionated vapors pass by a pipe 24 to a condenser 25 and a receiver 26. The condensed product is withdrawn at 28 and the gas is released at 27.

Returning to the stripper, it will be noted that the catalyst while subjected to reduced pressure loses its associated hydrocarbons which are separable and then drops into the lower portion and flows as a fluidized stream through a pipe 30 and thus to a regenerator 31. The regenerator is much the same type as the reactor vessel 4 but it is fed at 32 with air. It is fitted with catalyst separator 33 in the upper portion of the regeneration zone and regeneration gas is released by pipe 34, substantially free from solid material. The regenerated catalyst is taken from the base of the separator and recirculated by pipe 35. It is fed therefrom to the pipe 2, referred to above, through which it is brought again to the reactor 4, as aforesaid.

The present invention has been described and illustrated by particular reference to its application to a process of catalytic cracking of hydrocarbon oils, but it will be understood that the inventive feature may find value in many different types of reaction in which there are one or two stages in which the catalyst or other solid treating agent is employed and regenerated or otherwise disposed of. This invention may be adapted to hydroforming, for example, and to reactions of the same nature and also to other physical and chemical processes.

In the above specification, the catalyst is maintained in what has been referred to as a fluidized condition. By this it is meant that the solid in a finely divided state is suspended in a carrying gas or vapor so as to form a dense suspension which is capable of flow through pipes and valves, very much like a liquid showing both dynamic and static heads.

Within the reactor the upward velocity of the gas and vapor is of the order of .5 to 5 feet per second, preferably about 1.5 feet per second. At this rate the catalyst is maintained in a suspended condition in rapid agitation. The temperature distribution through the reactor is extremely uniform and the reactor is of sufficient size to provide for a contact time of 0.5 to 10.0 volumes of oil per volume of catalyst per hour. Some of the catalyst is carried through centrifugal separators but the greater portion is knocked back and returned to the bulk in the reactor. The temperature of the catalytic material is maintained at the usual cracking temperature between about 750 and 1000° F., depending on the degree of cracking desired, the type of oil fed and the nature of the products desired, just as in any other cracking process. The process is normally carried out at about atmospheric pressure by which we mean that a slight pressure of 10 to 100 pounds may be imposed if desired.

Catalyst removed from the cracking zone is discharged through the pressure reduction valve 10 which is adapted for easy adjustment, and thus released into a stripping zone of lower pressure. While in this zone the absorbed or mechanically held hydrocarbon constituents, which are volatile, are separated from the catalyst. This is greatly assisted by the use of reduced pressure, but it is not necessary to maintain a high vacuum. The greatest effect appears to be obtained in going to a vacuum of 26 to 28 inches of mercury with less incremental advantage for further increased pressure reduction. The stripper itself is shown on the drawing in rather diagrammatic form and various types of stripping zones may be used, either free from baffles or containing vertically or horizontally placed plates or members, to cause the catalyst to be shaken or tumbled to assist in the release of the volatile products. It is found that the stripping is greatly assisted by the passage of a small amount of stripping gas through the catalyst, but this volume should not be so great as to cause difficulty in maintaining of the reduced pressure. It is also found that the catalyst forms a lower phase within the stripping zone from which it may be withdrawn by the pipe 30 still in a highly fluidized condition.

The catalyst while in a fluidized condition is capable of flowing through the apparatus as indicated in the drawing without the use of fans, pumps or other mechanical devices operated directly on the powder laden gas or vapor. The flow is induced by maintaining proper densities of the opposing columns of the suspension. Gas may be added to a fluidized suspension and its most important effect is to decrease the density of the suspension. In this way a downstream column of suspension may be decreased in density so as to cause flow in the desired direction. The apparatus is designed throughout with this in mind so that a continuous circulation is effected.

To illustrate and emphasize the advantages in the use of the present invention, it has been found that when using a catalyst to oil ratio of 20:1, the gas oil held by the catalyst withdrawn from the reactor amounts to 2 to 4% of the feed when employing a stripper such as disclosed above but at atmospheric or higher pressure. By employing a vacuum stripper this may be reduced considerably, for practical purposes to zero, depending on the efficiency of the particular stripping equipment, the reduced pressure employed and other miscible conditions. In this manner the burning capacity necessary for the regenerator may be only 50 to 60% of that usually required.

In addition to the advantages in the saving of the oil, it is also a consequence that the burning capacity of the regenerator is reduced from about 8% of the feed to as low as 5 or 4% thereof. This can be taken advantage of either in the use of smaller equipment or increased oil capacity.

A further advantage is that the deteriorating effect of steam on the catalyst is greatly decreased and pressure and catalyst required will be reduced.

While the apparatus has been described mainly in connection with catalytic cracking, it will be realized that the process is capable of operation with any type of process utilizing a fluidized solid treating agent in which it is desired to obtain a separation of the small residual quantities of a reactant from the catalyst prior to regeneration or some other type of treatment.

I claim:

1. In a process for contacting gaseous reactants with finely divided solids wherein the finely divided solids are contacted with said gaseous reactants in a contacting zone maintained under superatmospheric pressure; the improvement in the method of separating gaseous reactants from said finely divided solids which comprises continuously passing a stream of said finely divided solids containing gasous reactants from said contacting zone to a separating zone, maintaining said separating zone under subatmospheric pressure, releasing pressure on the stream of solids passing from said contacting zone to said separating zone, separating a portion of the gaseous reactants from said stream of solids in said separating zone, collecting the solids so separated in a collecting zone in free and open communication with said separating zone whereby said collecting zone is maintained under substantially the same pressure as said separating zone, passing a stripping gas upwardly through said collecting zone to remove additional gaseous reactants from the finely divided solids therein and combining said stripping gas with the gaseous reactants removed from said solids in said separating zone.

2. In a process for the conversion of hydrocarbon oils wherein finely divided catalyst is continuously circulated through a conversion zone wherein it is contacted with hydrocarbon oil vapors to be converted and thereafter circulated through a regenerating zone wherein carbonaceous deposits contained on said catalyst are burned therefrom and the regenerated catalyst thereafter returned to said conversion zone; the improvement in the method of removing vaporous conversion products from the catalyst passing from said conversion zone to said regeneration zone which comprises maintaining said conversion zone under superatmospheric pressure, passing a stream of said finely divided catalyst from said conversion zone to a separating zone maintained at subatmospheric pressure, releasing pressure on the finely divided catalyst passing from said conversion zone to said separating zone, separating vaporous reaction products from said catalyst in said separating zone, collecting solids so separated in a collecting zone in free and open communication with said separating zone, passing a stripping gas upwardly through said collecting zone to remove additional vaporous reaction products from said finely divided solids in said collecting zone and combining the stripping gas with vaporous reaction products removed from said solids in said separating zone.

3. In the process defined by claim 2, the further improvement which comprises passing the gaseous stream from said separating zone through a cooling zone to condense normally liquid gaseous reaction products therefrom.

ROBERT W. KREBS.

REFERENCES CITED

The following references are of record in the file of this patent:

UNITED STATES PATENTS

| Number | Name | Date |
|---|---|---|
| 2,000,672 | Stratford et al. | May 7, 1935 |
| 2,289,329 | Prickett | July 7, 1942 |
| 2,327,175 | Conn | Aug. 17, 1943 |
| 2,354,261 | Hemminger | July 25, 1944 |
| 2,410,284 | Gunness | Oct. 29, 1946 |

FOREIGN PATENTS

| Number | Country | Date |
|---|---|---|
| 115,689 | Australia | Aug. 6, 1942 |